United States Patent
Takemura et al.

(10) Patent No.: US 10,507,543 B2
(45) Date of Patent: Dec. 17, 2019

(54) WELDING TORCH, WELDING ROBOT, AND WELDING SYSTEM

(71) Applicant: Kobe Steel, Ltd., Kobe-shi (JP)

(72) Inventors: Yoshiya Takemura, Fujisawa (JP); Shigeto Takada, Fujisawa (JP)

(73) Assignee: Kobe Steel, Ltd., Kobe-shi (JP)

( * ) Notice: Subject to any disclaimer, the term of this patent is extended or adjusted under 35 U.S.C. 154(b) by 302 days.

(21) Appl. No.: 15/355,942

(22) Filed: Nov. 18, 2016

(65) Prior Publication Data
US 2017/0173722 A1 Jun. 22, 2017

(30) Foreign Application Priority Data

Dec. 21, 2015 (JP) ................. 2015-248891

(51) Int. Cl.
*B23K 9/29* (2006.01)
*B23K 9/173* (2006.01)
*B23K 9/32* (2006.01)

(52) U.S. Cl.
CPC .............. *B23K 9/295* (2013.01); *B23K 9/173* (2013.01); *B23K 9/321* (2013.01)

(58) Field of Classification Search
CPC ......... B23K 9/173; B23K 9/295; B23K 9/321
USPC ..... 219/54, 60 R, 69.1, 121.11, 121.33, 136, 219/137.31, 137.43; 392/383
See application file for complete search history.

(56) References Cited

U.S. PATENT DOCUMENTS

2005/0056628 A1* 3/2005 Hu .................. B23K 26/144
219/121.84

FOREIGN PATENT DOCUMENTS

| CN | 102861975 A | 1/2013 |
|----|----|----|
| CN | 104209636 A | 12/2014 |
| JP | 5-138361 | 6/1993 |
| JP | 2014-233723 | 12/2014 |

OTHER PUBLICATIONS

Translation of JP2014233723.*

* cited by examiner

*Primary Examiner* — Dana Ross
*Assistant Examiner* — Joseph W Iskra
(74) *Attorney, Agent, or Firm* — Oblon, McClelland, Maier & Neustadt, L.L.P.

(57) ABSTRACT

A tip attached to a torch barrel of a welding torch includes: a cylindrical tip body attached to the torch barrel; a cylindrical orifice member fitted on an outer circumference of the tip body; an orifice-member support nut detachably attached to a front end outer circumference of the tip body and supporting the orifice member on the outer circumference of the tip body; a cylindrical contact tip detachably attached to a front-end inner circumference of the tip body; and an annular shield member disposed between the tip body and the contact tip. The shield member has an outer diameter set no less than a front-end outer diameter of the orifice-member support nut but no more than an outer diameter of the orifice member. A welding robot including the welding torch and a welding system including the welding robot and a welding power supply are also disclosed.

10 Claims, 8 Drawing Sheets

WELDING TORCH, WELDING ROBOT, AND WELDING SYSTEM

BACKGROUND OF THE INVENTION

Field of the Invention

The present invention relates to a welding torch, a welding robot, and a welding system to be used for gas-shielded arc welding.

Description of the Related Art

As conventional welding torches, there are known those provided with a cylindrical tip body connected to a torch barrel, a cylindrical orifice member fitted on an outer circumference of the tip body from a front end side of the tip body, an orifice-member support nut detachably provided on a front-end outer circumference of the tip body and supporting the orifice member on the tip body, and a cylindrical contact tip detachably provided at a front end of the tip body (for example, see JP 2014-233723 A).

Moreover, hitherto, there are known nozzle cleaning devices for a welding torch that remove spatters, which have adhered on an inner circumferential surface of a nozzle of such a welding torch and an outer circumferential surface of a tip, by inserting a long brush and a short brush, which are provided on a wheel, into the nozzle and turning the same (for example, see JP H05-138361 A).

SUMMARY OF THE INVENTION

However, there has been a possibility that in the welding torch disclosed in abovementioned JP 2014-233723 A, spatters may enter between the contact tip and the orifice-member support nut so that the accumulation speed of spatters may increase, and upon detachment or attachment of the contact tip and the orifice-member support nut, spatters may be bitten between their threaded portions so that the tip body may be damaged.

With the nozzle cleaning device disclosed in abovementioned JP H05-138361 A, on the other hand, the removal of spatters, which have entered between the contact tip and the orifice-member support nut, is difficult, resulting in more frequent cleaning. This has remained as an impediment to the automatic operation of a welding machine. Further, there has been a possibility that the more frequent cleaning may lead to increased wear of the brushes so that the frequency of replacement of the brushes may become higher and the welding costs may increase.

In addition, it has hitherto not been a practice to dispose, in the nozzle, a member for blocking spatters that fly from a front end of the contact tip, because such a member may disturb the flow of shielding gas through the nozzle to cause shielding failure.

The present invention has been made in view of the above problems, and an object thereof is to provide a welding torch, a welding robot, and a welding system capable of preventing shielding failure while preventing spatters from entering between a contact tip and an orifice-member support nut.

To achieve the abovementioned object, the present invention provides, in an aspect thereof, a welding torch including a torch barrel, a tip attached to the torch barrel, and a cylindrical nozzle attached to the torch barrel and internally housing the tip, the welding torch being to be used for gas-shielded arc welding. The tip includes a cylindrical tip body attached to the torch barrel, a cylindrical orifice member fitted on an outer circumference of the tip body, an orifice-member support nut detachably attached to a front-end outer circumference of the tip body and supporting the orifice member on the outer circumference of the tip body, a cylindrical contact tip detachably attached to a front-end inner circumference of the tip body, and an annular shield member disposed between the tip body and the contact tip. The shield member has an outer diameter set no less than a front-end outer diameter of the orifice-member support nut but no more than an outer diameter of the orifice member.

In the welding torch of the present invention, the shield member may have a plate thickness set at 0.5 to 3.0 mm, and the shield member may have an inner diameter set no more than one and a half times an outer diameter of a detachment/attachment portion of the contact tip.

In the welding torch of the present invention, the contact tip of the shield member may have, on a front end side thereof, a surface formed in a plane, and the plane may have a surface roughness (Ra) set at no more than 50 μm.

In the welding torch of the present invention, the shield member is made, at a surface thereof, of pure copper or an alloy containing no less than 50 wt % of copper.

In another aspect of the present invention, there is also provided a welding robot including the welding torch.

In a further aspect of the present invention, there is also provided a welding system including the welding robot and a welding power supply.

According to the present invention, the annular shield member is disposed between the tip body and the contact tip and the outer diameter of the shield member is set no less than the front-end outer diameter of the orifice-member support nut but no more than the outer diameter of the orifice member, so that spatters can be prevented from entering between the contact tip and the orifice-member support nut while preventing shielding failure.

BRIEF DESCRIPTION OF THE DRAWINGS

FIGS. 6A through 6E are diagrams for describing replacement of a contact tip of the welding torch and cleaning of the tip illustrated in FIG. 2, in which

DESCRIPTION OF THE PREFERRED EMBODIMENT

Hereinafter, an embodiment of a welding torch of the present invention will be described in detail with reference to the accompanying drawings.

[Regarding Configuration of Welding Torch]

First, to grasp the perspective of the welding torch according to the present embodiment, a welding robot 1 that uses the welding torch will be described.

Figure 1:
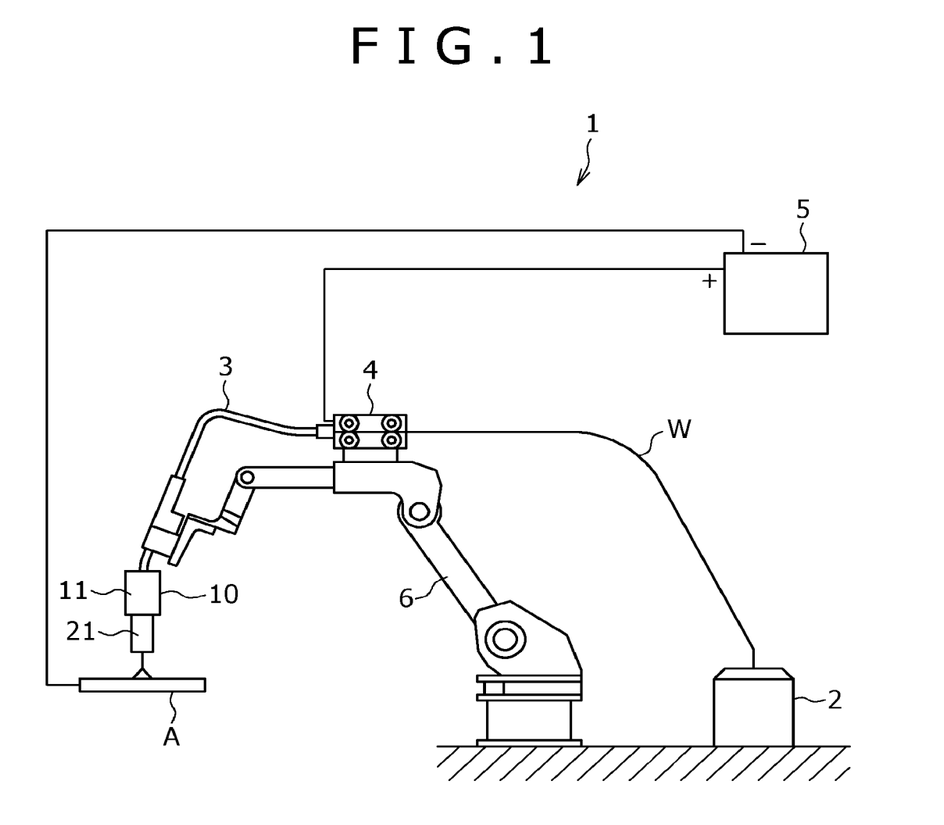
FIG. 1 is a schematic side view of a welding robot to which an embodiment of a welding torch of the present invention is used.
Figure 2:
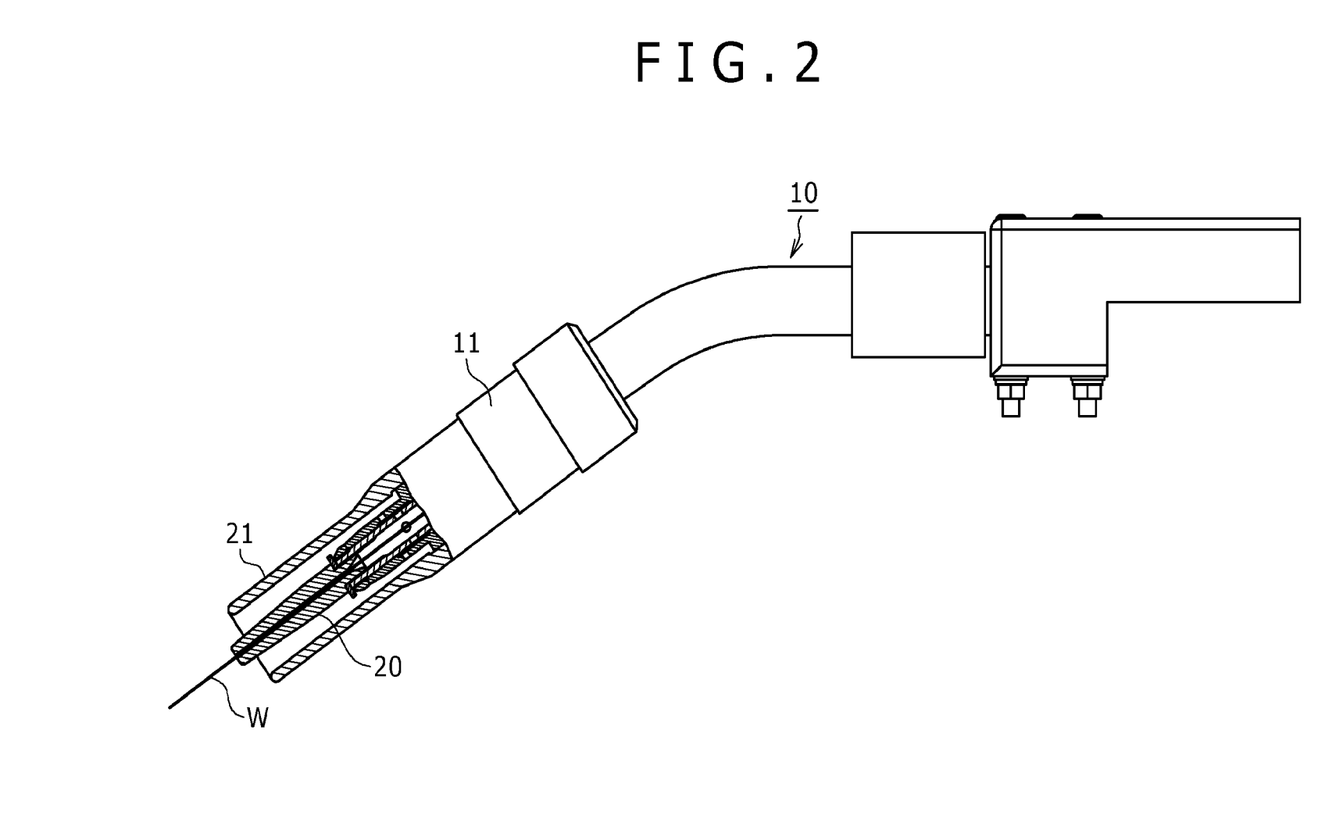
FIG. 2 is a partial sectional side view of the welding torch illustrated in FIG. 1.

As illustrated in FIGS. 1 and 2, the welding robot 1 includes a wire pack 2, a torch cable 3, a wire feed device 4, a welding power supply 5, a manipulator 6, and a welding torch 10. Note that the sign A in FIG. 1 denotes a base metal to be welded.

As illustrated in FIG. 1, the wire pack 2 is a feed source of a welding wire W and is configured to store the welding wire W in a predetermined volume. As the welding wire W, a copper-plated wire, and a wire without copper plating, or the like can be used, for example.

The torch cable 3 is configured to supply, to the welding torch 10, a welding current fed from the welding power supply 5, the welding wire W stored in the wire pack 2, and a shielding gas supplied from an unillustrated shielding gas storage device. The torch cable 3 is connected at an end thereof to the wire feed device 4 and at an opposite end thereof to the welding torch 10.

The wire feed device 4 is configured to let out the welding wire W by rollers or the like and to feed the same through the torch cable 3 to the welding torch 10. Owing to the provision of this wire feed device 4, the welding wire W can be automatically fed to the welding torch 10.

The welding power supply 5 is a supply of the welding current and supplies the welding current through the wire feed device 4 and the torch cable 3 to the welding torch 10.

The manipulator 6 is a multi-articulated robot with the welding torch 10 attached to a front end thereof, and its operation is controlled by an unillustrated robot control unit.

(Welding Torch)

Figure 3:
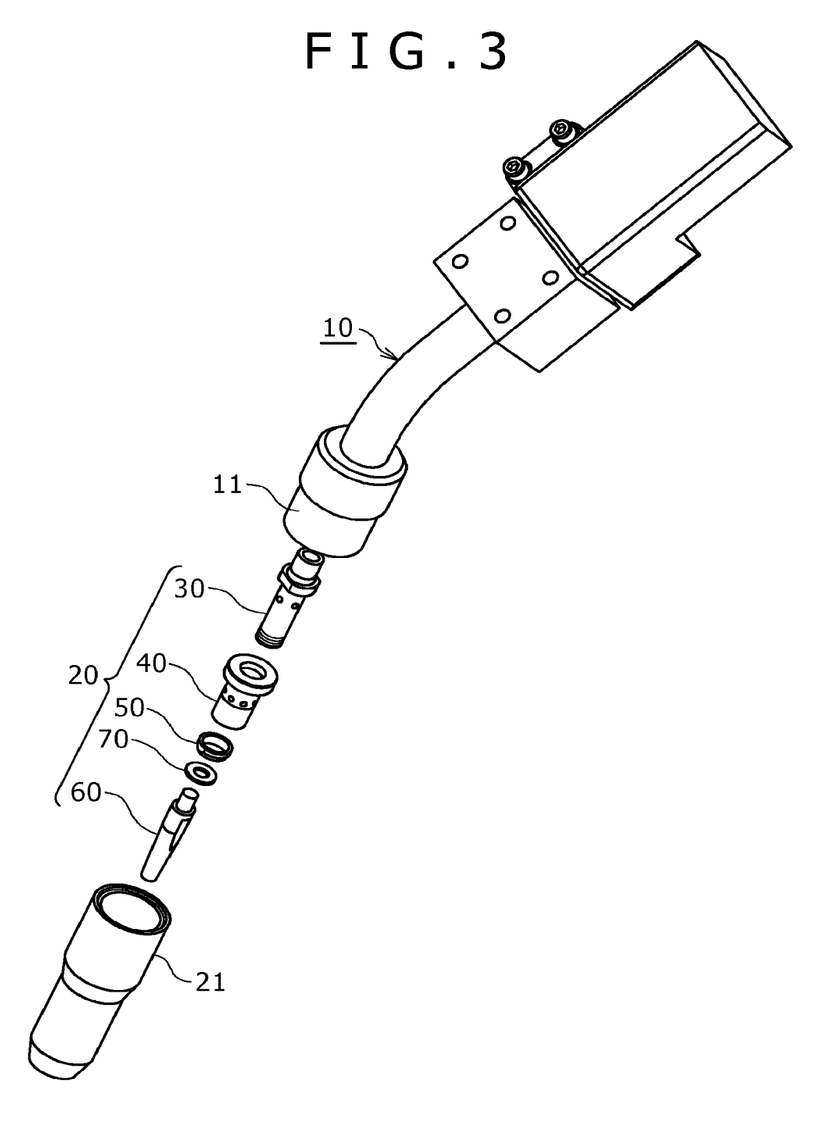
FIG. 3 is an exploded perspective view of the welding torch illustrated in FIG. 2.

As illustrated in FIGS. 2 and 3, the welding torch 10 includes a torch barrel 11 attached to the manipulator 6, a tip 20 attached to the torch barrel 11, and a cylindrical nozzle 21 attached to the torch barrel 11 and internally housing the tip 20, and is configured to perform gas-shielded arc welding.

(Torch Barrel)

Figure 4:
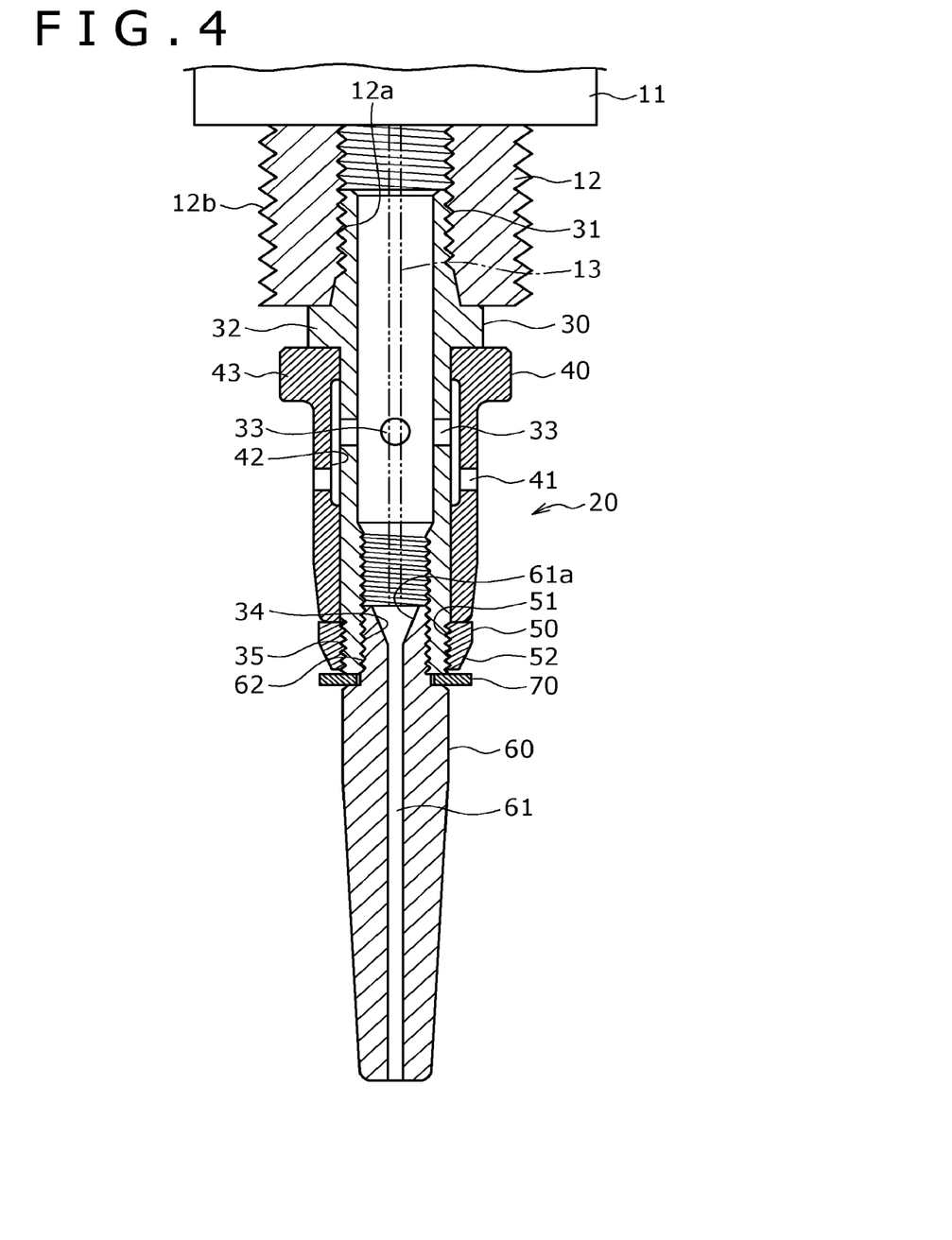
FIG. 4 is a cross-sectional view of a tip in the welding torch illustrated in FIG. 2.
Figure 5:
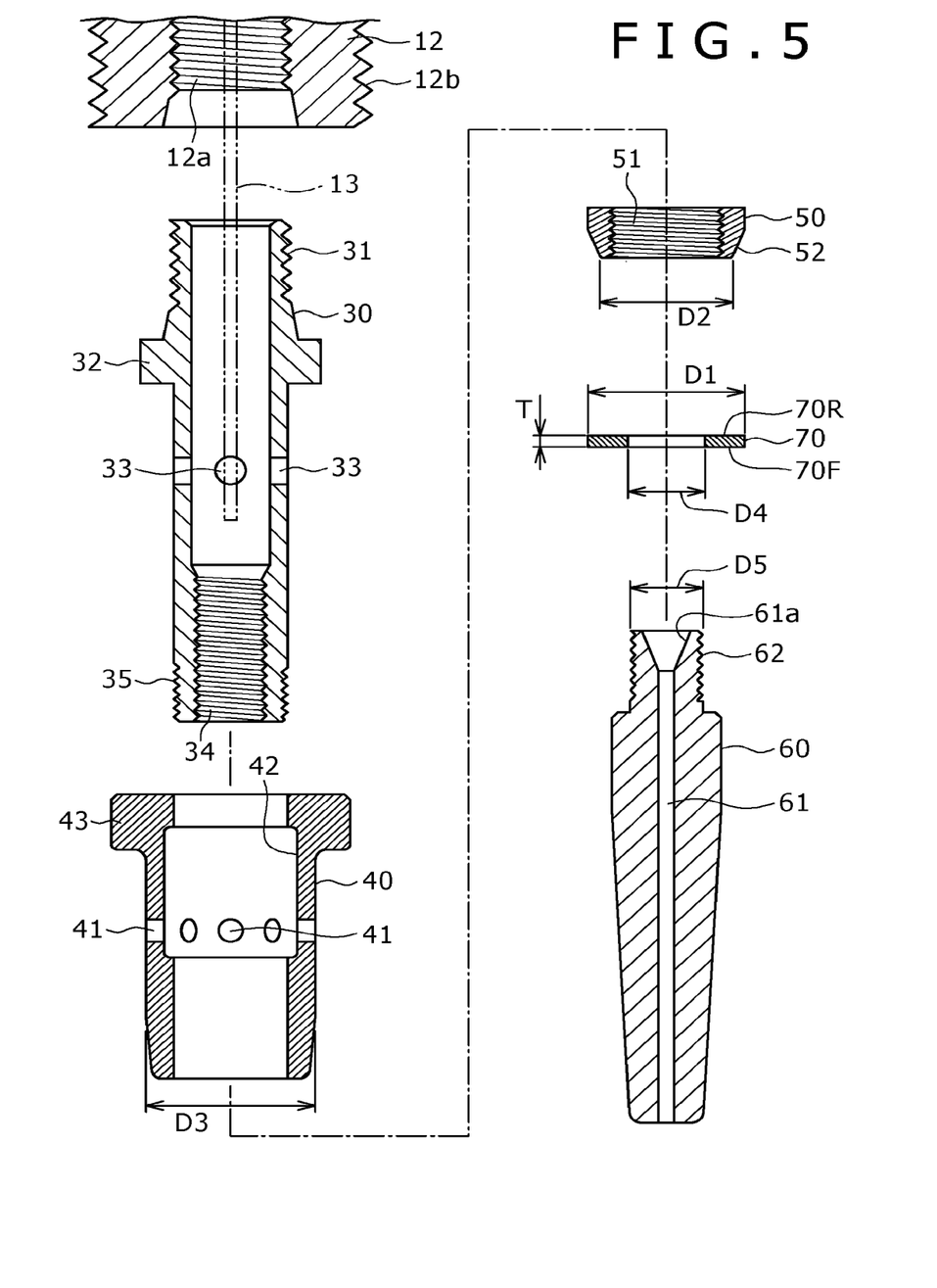
FIG. 5 is an exploded perspective view of the tip in the welding torch illustrated in FIG. 2.

As illustrated in FIGS. 4 and 5, on a front end portion of the torch barrel 11, there is formed a cylindrical holder 12, to which the tip 20 and the nozzle 21 are to be attached. Further, on an inner circumferential surface of the holder 12, an internal threaded portion 12a is formed for threaded engagement with a tip body 30 of the tip 20, and on an outer circumferential surface of the holder 12, an external threaded portion 12b is formed for threaded engagement with the nozzle 21. Note that to the torch barrel 11, the welding current, the welding wire W and the shielding gas are supplied through the torch cable 3.

Moreover, the torch barrel 11 includes an inner tube 13 that is disposed in the holder 12 and guides the welding wire W. This inner tube 13 is provided projecting from a front end of the holder 12 and is configured to be inserted into the tip body 30 by bringing the tip body 30 into threaded engagement with the internal threaded portion 12a of the holder 12.

(Tip)

The tip 20 includes the cylindrical tip body 30 attached to the torch barrel 11, a cylindrical orifice member 40 fitted on an outer circumference of the tip body 30 from a top end side of the tip body 30, an orifice-member support nut 50 detachably attached to a front-end outer circumference of the tip body 30 and supporting the orifice member 40 on the outer circumference of the tip body 30, a cylindrical contact tip 60 detachably attached to a front-end inner circumference of the tip body 30, and an annular shield member 70 held between the tip body 30 and the contact tip 60.

(Tip Body)

The tip body 30 is a cylindrical member made of a metal material having an electrical conductivity, such as copper, and on an outer circumferential surface of a rear end portion thereof, an external threaded portion 31 is formed for threaded engagement with the internal threaded portion 12a of the holder 12 of the torch barrel 11. When the tip body 30 is brought into engagement with the internal threaded portion 12a of the holder 12 of the torch barrel 11, a certain volume of space is formed between an inner circumferential surface of the tip body 30 and an outer circumferential surface of the inner tube 13.

Moreover, on an outer circumferential surface of the tip body 30, a flange portion 32 is formed such that it remains in contact with the orifice member 40 fitted on the outer circumference of the tip body 30 and acts to position the orifice member 40. Further, in the tip body 30, a plurality of through-holes 33 (four through-holes in the present embodiment) are formed at equal intervals in a circumferential direction to supply the shielding gas to the side of the orifice member 40.

In addition, on an inner circumferential surface of a front end portion of the tip body 30, an internal threaded portion 34 is formed for threaded engagement with the contact tip 60. Further, on an outer circumferential surface of the front end portion of the tip body 30, an external threaded portion 35 is formed for threaded engagement with the orifice-member support nut 50.

(Orifice Member)

The orifice member 40 is a cylindrical member made of a ceramic material. In the state that the orifice member 40 has been fitted on the tip body 30, a plurality of gas ejection holes 41 (eight holes in the present embodiment) are formed at positions closer to the side of a free end of the tip body 30 than the through-holes 33 and at equal intervals in the circumferential direction to eject the shielding gas into the nozzle 21.

Further, at an inner circumferential surface of the orifice member 40, a circumferential recess 42 is formed in communication with the eight gas ejection holes 41. This configuration allows a smooth guidance of the shielding gas, which has been supplied from the through-holes 33 of the tip body 30, through the circumferential recess 42 to the gas ejection holes 41, thereby enabling straightening of the shielding gas ejected from the gas ejection holes 41.

Moreover, on an outer circumferential surface of a rear end portion of the orifice member 40, a flange portion 43 is formed to close up a gap between an outer circumferential surface of the orifice member 40 and an inner circumferential surface of the nozzle 21. Thereby, spatters can be prevented from entering toward the side of the torch barrel 11 beyond the flange portion 43.

With the orifice member 40 being fitted on the tip body 30, the orifice-member support nut 50 is brought into threaded engagement with the external threaded portion 35 of the tip body 30, whereby the orifice member 40 is held between the flange portion 32 of the tip body 30 and the orifice-member support nut 50 and is supported on the tip body 30.

(Orifice-Member Support Nut)

The orifice-member support nut 50 is a ring-shaped member made of a metal material having an electrical conductivity, such as copper, and on an inner circumferential surface thereof, an internal threaded portion 51 is formed for threaded engagement with the external threaded portion 35 of the front end portion of the tip body 30.

Further, on a front side portion of an outer circumferential surface of the orifice-member support nut 50, a tapered surface 52 is formed over the entire circumference thereof so that its diameter decreases toward the front end thereof. Moreover, on a rear side portion of the outer circumferential surface of the orifice-member support nut 50, two parallel surfaces are formed in a radially symmetric manner for allowing to perform fastening with a tool, such as a spanner. As the orifice member 40 is then fastened by the orifice-member support nut 50, the orifice member 40 is restrained from turning in the circumferential direction.

Further, as a material of the orifice-member support nut 50, a material to which spatters are unlikely to adhere can be used preferably. Specifically, it has been found as a result of a cleaning test after adhesion of spatters that chromium copper is suited and brass may be used.

(Contact Tip).

The contact tip 60 is configured to supply the welding current to the welding wire W and also to guide the welding wire W to the base metal A to be welded. The contact tip 60 is made of a metal material having an electrical conductivity, such as copper.

The contact tip 60 is a cylindrical member having a guide hole 61 along an axial center thereof to guide the welding wire W. At a rear end portion of the guide hole 61, a tapered guide surface 61a is formed with a diameter increasing toward a rear side thereof, and owing to this tapered guide surface 61a, the welding wire W can be smoothly introduced into the guide hole 61.

Further, on an outer circumferential surface of a rear end portion of the contact tip 60, an external threaded portion 62 is formed for threaded engagement with the internal threaded portion 34 of the tip body 30. The external threaded portion 62 of the contact tip 60 is brought into threaded engagement with the internal threaded portion 34 of the tip body 30, whereby the guide hole 61 of the contact tip 60 is disposed facing a front end opening of the inner tube 13.

(Shield Member)

The shield member 70 is an annular plate member that is fitted on the external threaded portion 62 of the contact tip 60 from the rear side thereof. With the shield member 70 being fitted on the external threaded portion 62 of the contact tip 60, the external threaded portion 62 of the contact tip 60 is brought into threaded engagement with the internal threaded portion 34 of the tip body 30, whereby the shield member 70 is held between the tip body 30 and the contact tip 60. Consequently, the shield member 70 is disposed forward of the orifice member 40 and the orifice-member support nut 50.

Further, as illustrated in FIG. 5, the shield member 70 has an outer diameter D1 set no less than a front-end outer diameter D2 of the orifice-member support nut 50 but no more than an outer diameter D3 of the orifice member 40. If the outer diameter D1 of the shield member 70 is less than the front-end outer diameter D2 of the orifice-member support nut 50, spatters enter a gap between the tip body 30 and the orifice-member support nut 50 and a gap between the tip body 30 and the orifice member 40 and accumulate there so that shielding failure and damage to the tip body due to bitten spatters (a stop during automatic replacement) occur. Moreover, if the outer diameter D1 of the shield member 70 is greater than the outer diameter D3 of the orifice member 40, a flow of the shielding gas through the nozzle 21 becomes turbulent so that shielding failure occurs.

Further, the shield member 70 has a plate thickness T set at 0.5 to 3.0 mm. If the plate thickness T of the shield member 70 is no less than 0.5 mm, distortions of the shield member 70 due to heat through adhesion of spatters can be restrained. If the plate thickness T of the shield member 70 is no more than 3.0 mm, spatters can be restrained from adhering to an outer circumferential surface of the shield member 70.

Further, the shield member 70 has an inner diameter D4 set no more than one and a half times an outer diameter D5 of the external threaded portion 62 that is a detachment/attachment portion of the contact tip 60. If the inner diameter D4 of the shield member 70 is no more than one and a half times the outer diameter D5 of the external threaded portion 62, dislocation of the shield member 70 in a radial direction can be reduced, and hence, shielding is feasible while maintaining improved symmetricity.

Moreover, the shield member 70 in the present embodiment is an annular plate member so that a front surface of the shield member (the surface of the shield member 70 on the side of the front end of the contact tip 60) 70F and a rear surface (the surface of the shield member 70 on the side of the rear end of the contact tip 60) 70R are each formed in a plane. Further, the front surface 70F and the rear surface 70R of the shield member 70 have a surface roughness (Ra) set at no more than 50 μm. If the surface roughnesses (Ra) of the front surface 70F and the rear surface 70R of the shield member 70 are each set at no more than 50 μm, spatters can be restrained from adhering to the front surface 70F and the rear surface 70R of the shield member 70, and further, if the surface roughnesses (Ra) of the front surface 70F and the rear surface 70R of the shield member 70 are each set at no more than 20 μm, spatters can be further restrained from adhering. Accordingly, even if spatters adhere, they can be easily removed by a brush or the like of a cleaning device. Note that each surface roughness (Ra) is an arithmetic average roughness, and is a value determined by sampling a standard length from a roughness curve in the direction of its average line, summing the absolute values of deviations from the average line to the roughness curve in the sampled section, and calculating the average of the absolute values.

Note that spatters are metal particles in a melted state when produced, adhere to a surface, such as an inner surface, of the nozzle 21, and accumulate through solidification. If the roughness of a surface to which spatters adhere is large, the adhered melted metal enters concavities in the surface and, after solidification, tends to act as strong mechanical bonds and is hardly removable.

Further, the shield member 70 is made, at a surface thereof, of pure copper or an alloy containing no less than 50 wt % of copper. This may be of either of the following two cases: the shield member 70 is formed, in its entirety, of pure copper or the alloy containing no less than 50 wt % of copper; or on the surface of the shield member 70, a coating of pure copper or the alloy containing no less than 50 wt % of copper is formed.

If the surface of the shield member 70 is made of pure copper or the alloy containing no less than 50 wt % of copper, spatters can be restrained from adhering to the shield member 70, and even if spatters adhere, they can be easily removed by a brush or the like of a cleaning device. If the surface of the shield member 70 is made of pure copper or the alloy containing no less than 50 wt % of copper, the wettability of solid copper with melted iron is reduced so that adhered spatters can be more easily separated.

(Nozzle)

The nozzle 21 is a cylindrical member made of a metal material and is configured to blow a shielding gas, such as argon (Ar) or carbon dioxide ($CO_2$), from the gas ejection holes 41 of the orifice member 40 onto the base metal A under welding. Further, the nozzle 21 has an internal space capable of internally housing the tip 20. Moreover, on an inner circumferential surface of a rear end portion of the nozzle 21, an internal threaded portion 21*a* (see FIG. 6E) is formed for threaded engagement with the external threaded portion 12*b* of the holder 12 of the torch barrel 11.

Next, the replacement of the contact tip 60 and the cleaning of the tip 20, both of which constitute the welding torch 10, will be described. Note that the inner surface of the guide hole 61 of the contact tip 60 is worn by the welding wire W so that the contact tip 60 is required to be replaced upon elapse of a predetermined welding time. Further, to the inner surface of the nozzle 21 and the outer surface of the tip 20 (the outer surfaces of the orifice member 40, the orifice-member support nut 50, the contact tip 60, and the shield member 70), spatters adhere as the welding time passes on so that these surfaces are required to be cleaned. Moreover, the shield member 70 can be continuously used after cleaning, but is replaced together with the contact tip 60 for the convenience of replacement of the contact tip 60.

Here, a case is assumed, in which the contact tip 60 constituting the welding torch 10 is automatically replaced and a device that automatically cleans the outer surface of the tip 20 (hereinafter referred to as "replacing and cleaning device") is used. The replacement and cleaning device may use, for example, the technology disclosed in JP 2012-130928 A or JP H07-60448 A, or may use another known technology. Note that the replacement of the contact tip 60 and the cleaning of the tip 20 can be also performed manually. In such a case, the "replacing and cleaning device" shall be as a "replacing and cleaning worker."

Figures 6A, 6B:
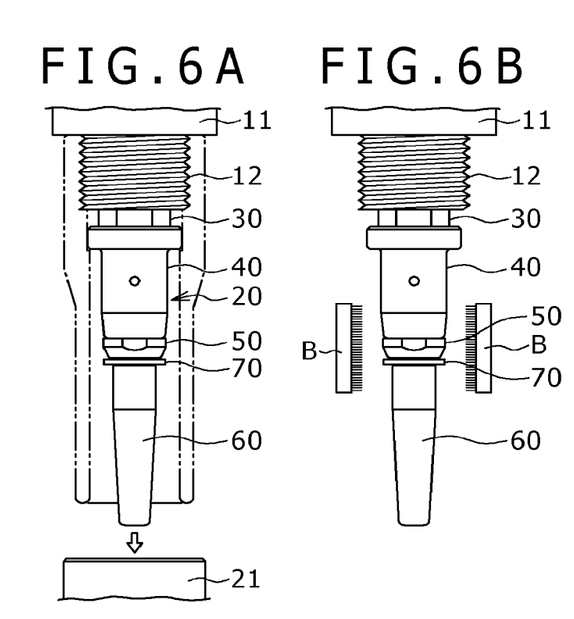
FIG. 6A is a side view illustrating a state in which a nozzle has been detached.
FIG. 6B is a side view illustrating a state of cleaning an outer circumference of the tip by brushes.

First, the replacing and cleaning device turns the nozzle 21 and detaches the nozzle 21 from the torch barrel 11 (see FIG. 6A).

Subsequently, the replacing and cleaning device allows metal brushes B to slide in the circumferential direction and an axial direction while the brushes B are maintained pressed against the outer surface of the tip 20, whereby removing spatters and cleaning the outer surface of the tip 20 (see FIG. 6B). Note that although not illustrated, the inner surface of the detached nozzle 21 is also cleaned.

Figure 6C:
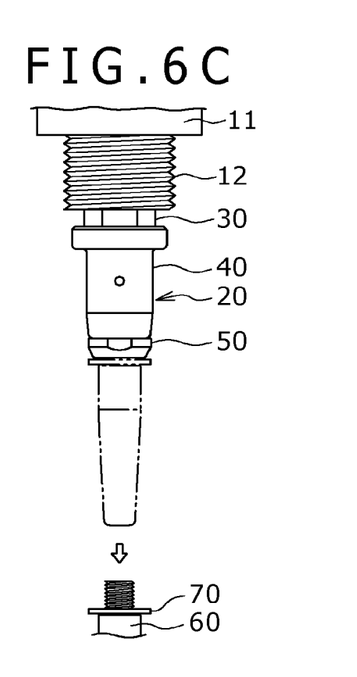
FIG. 6C is a side view illustrating a state in which the worn contact tip and a shield member have been detached.

Subsequently, the replacing and cleaning device turns the contact tip 60 to detach it together with the shield member 70 from the tip body 30 (see FIG. 6C). In the welding torch 10 according to the present embodiment, the orifice member 40 is supported by the orifice-member support nut 50 so that the orifice member 40 does not fall down even after the contact tip 60 has been detached.

Figures 6D, 6E:
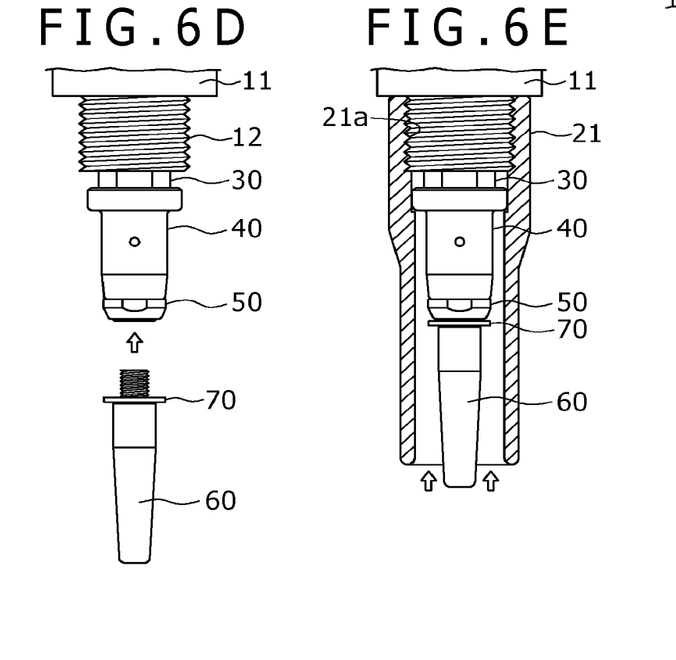
FIG. 6D is a side view illustrating a new contact tip and shield member, in which they are being attached.
FIG. 6E is a partial sectional side view illustrating a state in which the nozzle has been attached.

Subsequently, the replacing and cleaning device attaches a new contact tip 60 and a new shield member 70 to a front end of the tip body 30 (see FIG. 6D). In the welding torch 10 according to the present embodiment, the shield member 70 is held between the tip body 30 and the contact tip 60.

Subsequently, the replacing and cleaning device attaches the thus-cleaned nozzle 21 to the torch barrel 11 (see FIG. 6E). The replacement of the contact tip 60 and the cleaning of the tip 20, both of which constitute the welding torch 10, have now been completed.

As described above, the welding torch 10 of the present embodiment is provided with the annular shield member 70 held between the tip body 30 and the contact tip 60, and the outer diameter D1 of the shield member 70 is set no less than the front-end outer diameter D2 of the orifice-member support nut 50 but no more than the outer diameter D3 of the orifice member 40 so that spatters can be prevented from entering between the contact tip 60 and the orifice-member support nut 50. Moreover, the flow of the shielding gas through the nozzle 21 is not disturbed so that shielding failure can be prevented.

Further, according to the welding torch 10 of the present embodiment, the shield member 70 is disposed forward of the orifice member 40 and the orifice-member support nut 50 so that spatters, which have flown into surroundings of the orifice member 40 and the orifice-member support nut 50, can be blocked by the shield member 70 to decrease spatters which are to adhere to the outer circumferences of the orifice member 40 and the orifice-member support nut 50. Accordingly, the time for cleaning the tip 20 by the brushes B of the replacing and cleaning device can be reduced and the wear of the brushes B can be decreased so that the efficiency of automatic operation of the welding machine can be improved and the frequency of replacement of the brushes B can be lowered to reduce the welding costs. Moreover, the cleaning time of the orifice member 40 made of the hard ceramic material can be reduced so that the wear of the brushes B can be further decreased.

Further, according to the welding torch 10 of the present embodiment, the inner diameter D4 of the shield member 70 is set no more than one and a half times the outer diameter D5 of the external threaded portion 62 of the contact tip 60 so that dislocation of the shield member 70 in the radial direction can be reduced, and hence, shielding is feasible while maintaining improved symmetricity.

Further, according to the welding torch 10 of the present embodiment, the surface roughnesses (Ra) of the front surface 70F and the rear surface 70R of the shield member 70 are each set at no more than 50 μm. Therefore, spatters can be restrained from adhering to the front surface 70F and the rear surface 70R of the shield member 70 and, even if spatters adhere, they can be easily removed by brushes or the like of a cleaning device.

Further, according to the welding torch 10 of the present embodiment, the surface of the shield member 70 is made of pure copper or the alloy containing no less than 50 wt % of copper. Therefore, spatters can be restrained from adhering to the shield member 70 and, even if spatters adhere, they can be easily removed by brushes or the like of a cleaning device.

Figure 7:
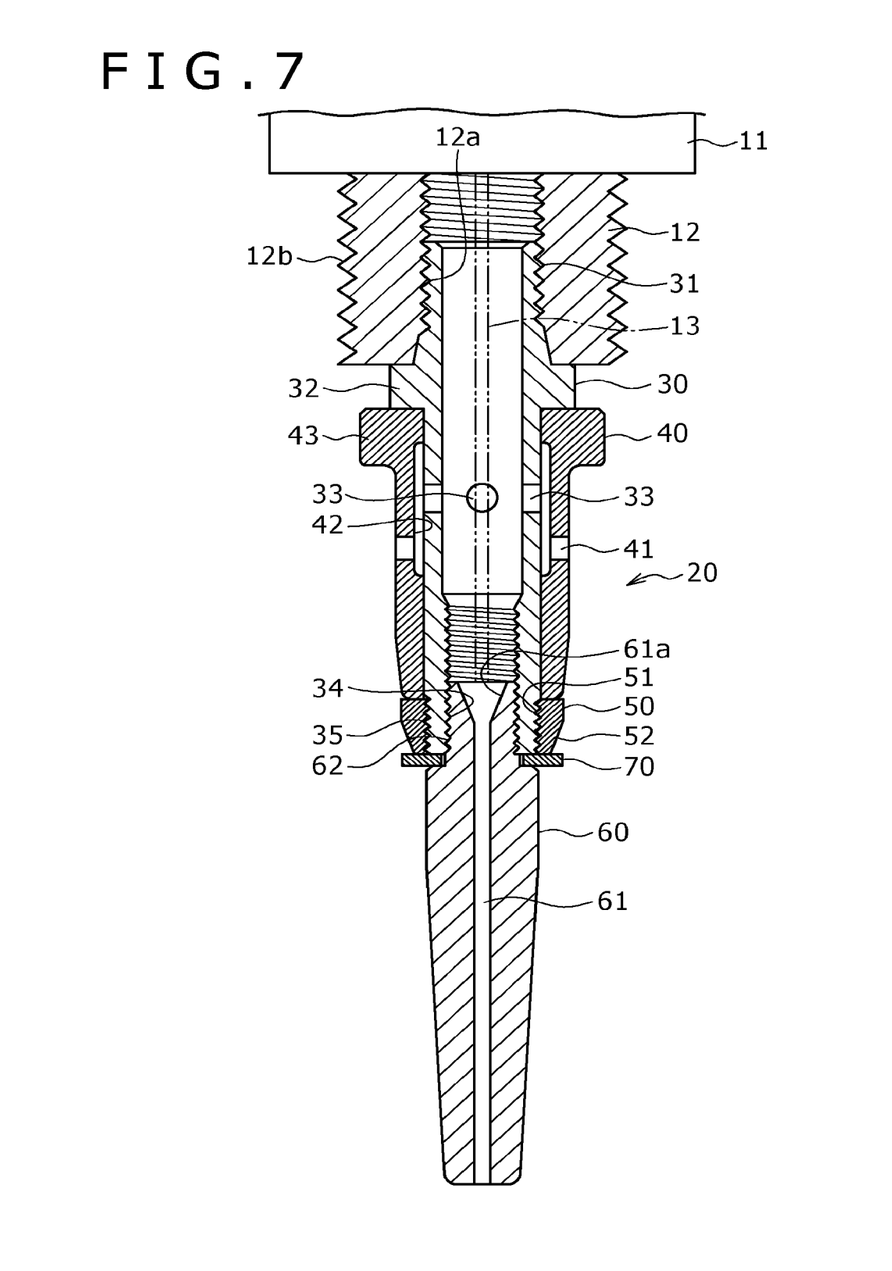
FIG. 7 is a similar cross-sectional view as in FIG. 4, which illustrates a first modification of the tip.

Next, as a first modification of the tip 20 in the present embodiment, as illustrated in FIG. 7, an orifice-member support nut 50 may be configured to have an extended axial length so that the orifice-member support nut 50 and the tip body 30 are flush with each other at front end faces thereof. In such a case, the shield member 70 is configured to be held between the tip body 30 and orifice-member support nut 50 and the contact tip 60. Note that in the present modification, the axial length of the orifice-member support nut 50 has been extended, but the axial length of the tip body 30 may be reduced instead.

Figure 8:
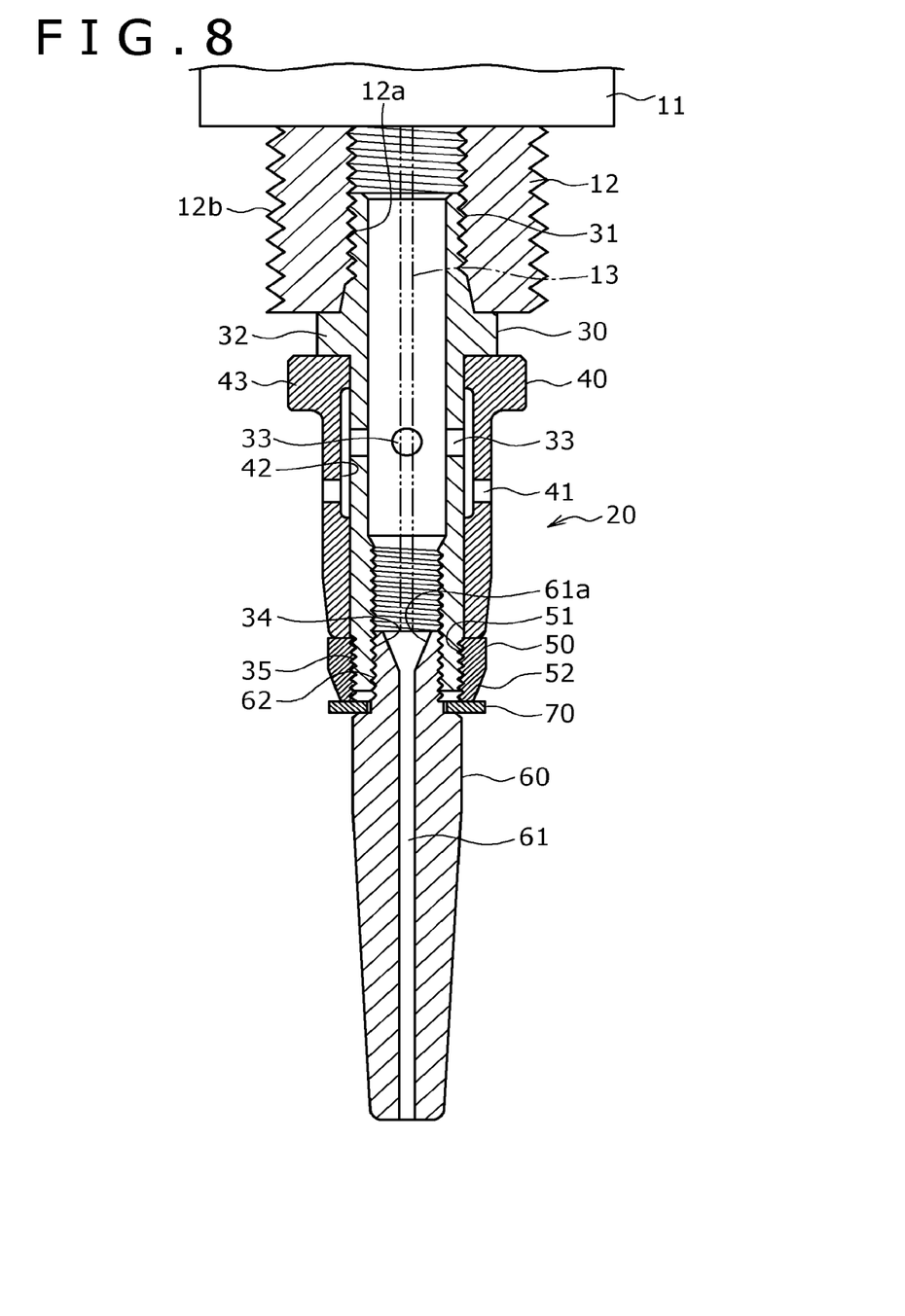
FIG. 8 is a similar cross-sectional view as in FIG. 4, which illustrates a second modification of the tip.

Next, as a second modification of the tip 20 in the present embodiment, as illustrated in FIG. 8, an orifice-member support nut 50 may be configured to have a further-extended axial length so that the orifice-member support nut 50 may be located, at a front end face thereof, forward of the front end face of the tip body 30. In such a case, the shield member 70 is configured to be held between the orifice-member support nut 50 and the contact tip 60. Note that in the present modification, the axial length of the orifice-member support nut 50 has been extended, but the axial length of the tip body 30 may be reduced instead.

Note that the present invention should not be limited to the embodiment exemplified above, but changes can be made as needed within the scope not departing from the gist of the invention.

For example, in the above embodiment, the shield member is a discrete member. However, the shield member is not limited to such a configuration, and may be formed integrally with the orifice-member support nut and the contact tip.

EXAMPLES

To confirm advantageous effects of the present invention, welding torches including the shield members of Examples 1-8 and Comparative Examples 1-3 as indicated in Table 1 were provided, and were each then subjected to a welding test. In that test, continuous welding for one hour and automatic cleaning (contact tip replacement, nozzle cleaning) were repeatedly performed 10 times (10 hours in total), and shielding performance with shielding gas, continuous automatic operability, and resistance to spatter adhesion were checked.

Next, welding conditions in that test will be described. Note that the welding conditions to be described herein are illustrative, and the embodiment of the present invention should not be limited to the following welding conditions.

Welding Conditions
Welding current: 300 A
Arc voltage: 32 V
Welding speed: 30 cm/min
Wire extension: 25 mm
Shielding gas: 100% $CO_2$ gas
Outer diameter of orifice member: 14 mm
Front-end outer diameter of orifice-member support nut: 10 mm
Outer diameter of external threaded portion of contact tip: 6 mm The shielding performance in Table 1 above was rated x under the assumption of occurrence of shielding failure when pits were formed in a welded part, but was rated ○ when no pits were formed. The continuous automatic operability was rated x when the operation stopped during automatic cleaning, but was rated ○ when the operation did not stop for 10 hours. Regarding the resistance to spatter adhesion, on the other hand, the adhesion amount of spatters on the shield member was measured only when the shielding performance and the continuous automatic operability were both rated ○. If the adhesion amount of spatters on a shield member is no more than 3 g, the spatters adhered on the shield member are less likely to remain after automatic cleaning, whereby making it possible to further restrain the accumulation of spatters through adhesion in the subsequent welding. Thus, the resistance to spatter adhesion was rated ○ as a preferred condition when the adhesion amount of spatters on the shield member was no more than 3 g, but was rated Δ when the adhesion amount of spatters on the shield member exceeded 3 g.

As apparent from Table 1, Examples 1, 5, 7 and 8 were good in both shielding performance and continuous automatic operability and were as small as no more than 3 g in the adhesion amount of spatters. The conditions in these examples were, therefore, found to be preferred.

On the other hand, Example 2 was good in both shielding performance and continuous automatic operability, but was greater than 3 g in the adhesion amount of spatters. The adhesion amount of spatters over 3 g is considered to be attributable to the fitting of the shield member with its dislocation in a radial direction being left as it was, because the inner diameter of the shield member of Example 2 was greater than one and a half times (9 mm) the outer diameter of the external threaded portion of the contact tip.

Example 3 was good in both shielding performance and continuous automatic operability, but was greater than 3 g in the adhesion amount of spatters. The adhesion amount of spatters over 3 g is considered to be attributable to the adhesion of spatters on the outer circumferential face of the shield member, because the plate thickness of the shield member of Example 3 was greater than 3.0 mm.

Example 4 was good in both shielding performance and continuous automatic operability, but was greater than 3 g in the adhesion amount of spatters. The adhesion amount of spatters over 3 g is considered to be attributable to inferior

TABLE 1

| | | Shield member specification | | | | | Continuous | |
| --- | --- | --- | --- | --- | --- | --- | --- | --- |
| | Outer diameter (mm) | Inner diameter (mm) | Plate thickness (mm) | Material | Surface roughness (Ra) (μm) | Shield property | automatic operation property | Spatter adhesion property |
| 1 Example 1 | 14 | 7.0 | 1.0 | 99%Cu—1%Cr | 10 | ○ | ○ | ○ |
| 2 Example 2 | 14 | 9.5 | 1.0 | 99%Cu—1%Cr | 10 | ○ | ○ | Δ |
| 3 Example 3 | 14 | 7.0 | 3.5 | 99%Cu—1%Cr | 10 | ○ | ○ | Δ |
| 4 Example 4 | 14 | 7.0 | 1.0 | 40%Cu—60%Cr | 10 | ○ | ○ | Δ |
| 5 Example 5 | 14 | 7.0 | 1.0 | 99%Cu—1%Cr | 40 | ○ | ○ | ○ |
| 6 Example 6 | 14 | 7.0 | 1.0 | 99%Cu—1%Cr | 55 | ○ | ○ | Δ |
| 7 Example 7 | 11 | 7.0 | 1.0 | 99%Cu—1%Cr | 10 | ○ | ○ | ○ |
| 8 Example 8 | 10 | 7.0 | 1.0 | 99%Cu—1%Cr | 10 | ○ | ○ | ○ |
| 8 Comparative Example 1 | 9.5 | 7.0 | 1.0 | 99%Cu—1%Gr | 10 | x | x | — |
| 10 Comparative Example 2 | 15 | 7.0 | 1.0 | 99%Cu—1%Cr | 10 | x | ○ | — |
| 11 Comparative Example 3 | No shield member provided (conventional welding torch) | | | | | x | x | — | removability of spatters, because the material of the shield member of Example 4 was an alloy containing less than 50 wt % of copper.

Example 6 was good in both shielding performance and continuous automatic operability, but was greater than 3 g in the adhesion amount of spatters. The adhesion amount of spatters over 3 g is considered to be attributable to inferior removability of spatters, because the surface roughness (Ra) of the shield member of Example 6 exceeded 50 μm and was high.

Comparative Example 1 was a case in which the outer diameter of the shield member was less than the front end outer diameter (10 mm) of the orifice-member support nut. In Comparative Example 1, the shield effect against spatters was low so that spatters accumulated on the outer surface of the orifice member and between the contact tip and the orifice member support nut, shielding failure occurred, and finally, the operation stopped during the replacement of the contact tip.

Comparative Example 2 was a case in which the outer diameter of the shield member was greater than the outer diameter (14 mm) of the orifice member. In Comparative Example 2, the shield effect against spatters was high, but the flow of the shielding gas was blocked by the shield member so that shielding failure occurred.

Comparative Example 3 was a case of a conventional welding torch with no shield member. In Comparative Example 3, as the welding was repeated, spatters accumulated in the nozzle, shielding failure occurred, and finally, the operation stopped during the replacement of the contact tip.

What is claimed is:

1. A welding torch for gas-shielded arc welding, comprising:
   a torch barrel,
   a tip attached to the torch barrel, and
   a cylindrical nozzle attached to the torch barrel and internally housing the tip,
   wherein the tip includes:
   a cylindrical tip body attached to the torch barrel,
   a cylindrical orifice member fitted on an outer circumference of the tip body,
   an orifice-member support nut detachably attached to a front-end outer circumference of the tip body and supporting the orifice member on the outer circumference of the tip body,
   a cylindrical contact tip detachably attached to a front-end inner circumference of the tip body, and
   an annular shield member disposed between the tip body and the contact tip, wherein
   the shield member has an outer diameter set no less than a front-end outer diameter of the orifice-member support nut but no more than an outer diameter of the orifice member.

2. The welding torch according to claim 1, wherein:
   the shield member has a plate thickness set at 0.5 to 3.0 mm, and
   the shield member has an inner diameter set no more than one and a half times an outer diameter of a detachment/attachment portion of the contact tip.

3. The welding torch according to claim 1, wherein:
   the contact tip of the shield member has, on a front end side thereof, a surface formed in a plane, and
   the plane has a surface roughness (Ra) set at no more than 50 μm.

4. The welding torch according to claim 2, wherein:
   the contact tip of the shield member has, on a front end side thereof, a surface formed in a plane, and
   the plane has a surface roughness (Ra) set at no more than 50 μm.

5. The welding torch according to claim 1, wherein:
   the shield member is made, at a surface thereof, of pure copper or an alloy containing no less than 50 wt % of copper.

6. The welding torch according to claim 2, wherein:
   the shield member is made, at a surface thereof, of pure copper or an alloy containing no less than 50 wt % of copper.

7. The welding torch according to claim 3, wherein:
   the shield member is made, at the surface thereof, of pure copper or an alloy containing no less than 50 wt % of copper.

8. The welding torch according to claim 4, wherein:
   the shield member is made, at the surface thereof, of pure copper or an alloy containing no less than 50 wt % of copper.

9. A welding robot comprising:
   a robot arm; and
   a welding torch for gas-shielded arc welding, the welding torch comprising:
   a torch barrel,
   a tip attached to the torch barrel, and
   a cylindrical nozzle attached to the torch barrel and internally housing the tip,
   wherein the tip includes:
   a cylindrical tip body attached to the torch barrel,
   a cylindrical orifice member fitted on an outer circumference of the tip body,
   an orifice-member support nut detachably attached to a front-end outer circumference of the tip body and supporting the orifice member on the outer circumference of the tip body,
   a cylindrical contact tip detachably attached to a front-end inner circumference of the tip body, and
   an annular shield member disposed between the tip body and the contact tip, wherein
   the shield member has an outer diameter set no less than a front-end outer diameter of the orifice-member support nut but no more than an outer diameter of the orifice member.

10. A welding system comprising:
    a welding robot having a robot arm;
    a welding torch for gas-shielded arc welding, the welding torch comprising:
    a torch barrel,
    a tip attached to the torch barrel, and
    a cylindrical nozzle attached to the torch barrel and internally housing the tip,
    wherein the tip includes:
    a cylindrical tip body attached to the torch barrel,
    a cylindrical orifice member fitted on an outer circumference of the tip body,
    an orifice-member support nut detachably attached to a front-end outer circumference of the tip body and supporting the orifice member on the outer circumference of the tip body,
    a cylindrical contact tip detachably attached to a front-end inner circumference of the tip body, and
    an annular shield member disposed between the tip body and the contact tip, wherein the shield member has an outer diameter set no less than a front-end outer diameter of the orifice-member support nut but no more than an outer diameter of the orifice member; and a welding power supply for supplying power to the welding torch.

* * * * *